United States Patent [19]

Fitter et al.

[11] Patent Number: 4,544,004
[45] Date of Patent: Oct. 1, 1985

[54] FILLER UNIT FOR TOPPING UP A CONTAINER WITH LIQUID

[75] Inventors: Johan C. Fitter, 48 Maluti Ave., Quellerina, Florida, Transvaal; David J. Henderson, Krugersdorp, both of South Africa

[73] Assignee: Johan Christiaan Fitter, South Africa

[21] Appl. No.: 573,035

[22] Filed: Jan. 24, 1984

[30] Foreign Application Priority Data

Jan. 26, 1983 [ZA] South Africa ................. 83/0502

[51] Int. Cl.⁴ ............................................. B65B 3/06
[52] U.S. Cl. ...................................... 141/31; 141/95; 141/198; 141/286
[58] Field of Search ................. 141/192–229, 141/285–310, 94, 95, 96, 31

[56] References Cited

U.S. PATENT DOCUMENTS

| | | | |
|---|---|---|---|
| 518,306 | 4/1894 | Clark | 141/198 |
| 4,079,761 | 3/1978 | Herbst | 141/198 |
| 4,176,694 | 12/1979 | Dickerson | 141/198 |

Primary Examiner—Houston S. Bell, Jr.
Attorney, Agent, or Firm—Barnes, Kisselle, Raisch, Choate, Whittemore & Hulbert

[57] ABSTRACT

A battery filler unit for automatically filling a battery container to a predetermined level consists of a vessel containing liquid to be dispensed into the battery. The vessel is supplied with liquid in a manner to maintain a constant head in the vessel. An orifice in the bottom of the vessel above a downpipe, extending in use into the top of a battery, ensures that an air seal is formed across the orifice by the action of surface tension of the dispensing liquid. As the container fills, air is trapped in the downpipe and dispensing of liquid from the vessel ceases when a pressure equilibrium is established, at which time the liquid level in the container will be at a predetermined desired level.

9 Claims, 13 Drawing Figures

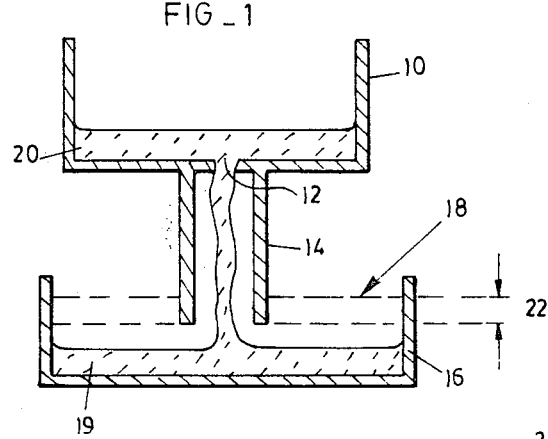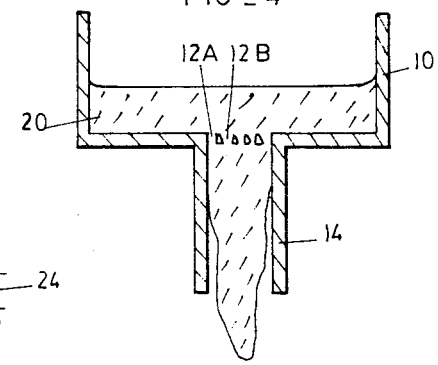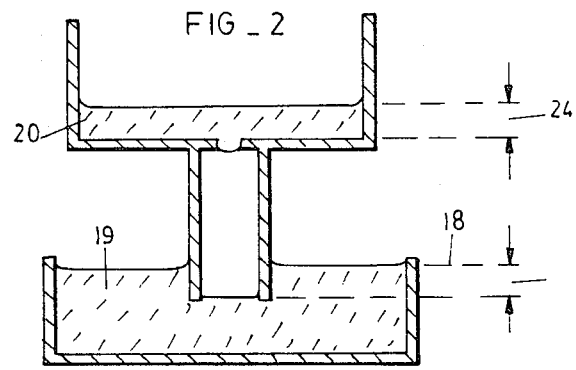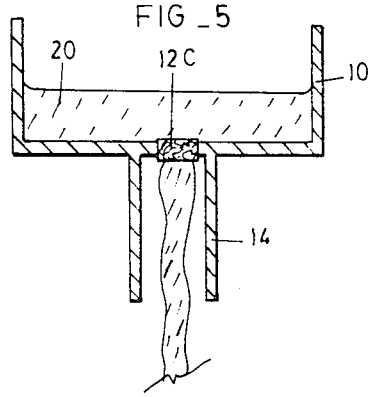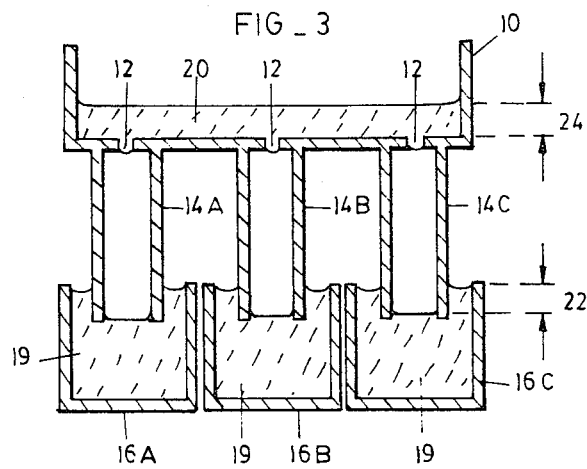

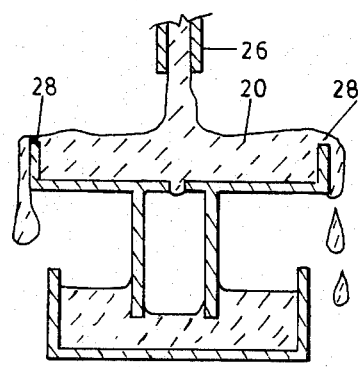
FIG_6
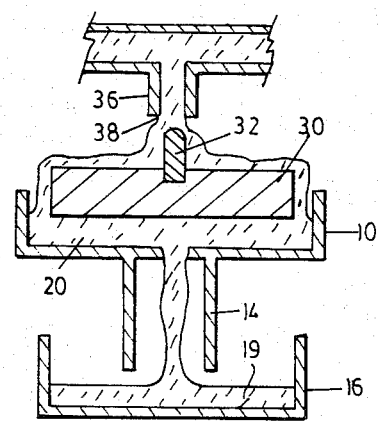
FIG_7
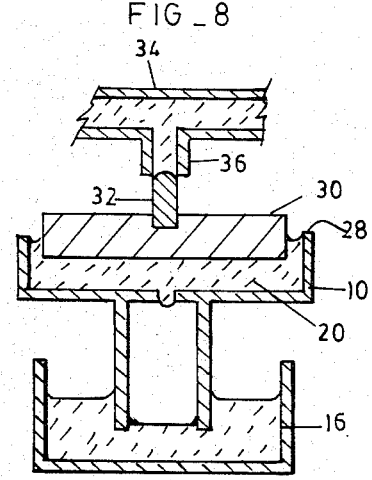
FIG_8
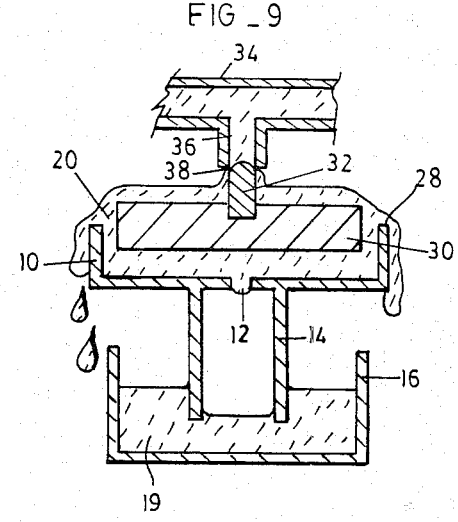
FIG_9

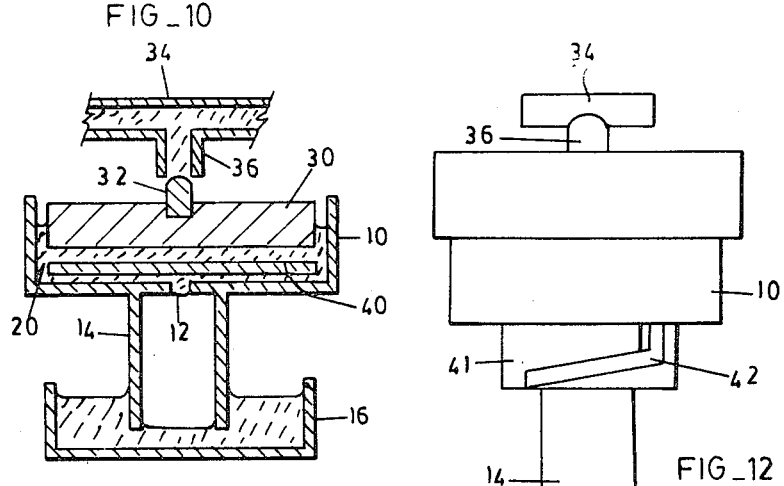
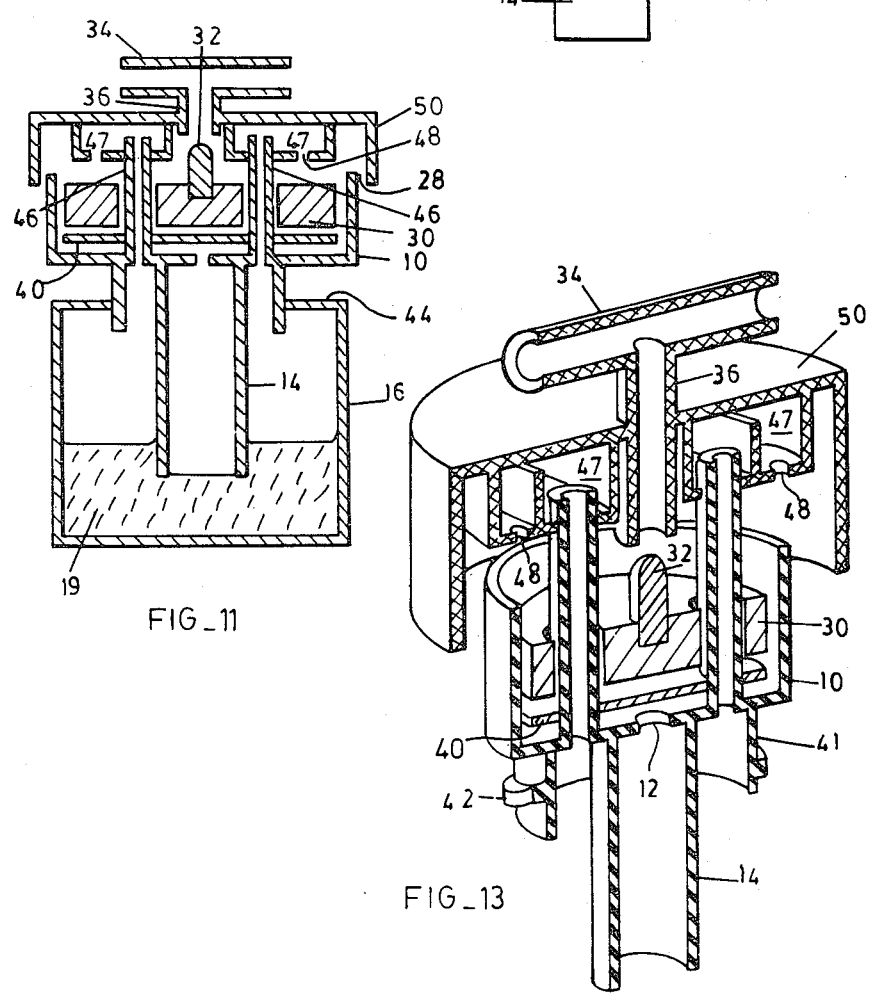

FILLER UNIT FOR TOPPING UP A CONTAINER WITH LIQUID

BACKGROUND TO THE INVENTION

This invention relates to a filler unit for topping up a container with a liquid to a predetermined, desired level. In one application, the unit is suitable for use in topping up the secondary cells of batteries.

Secondary cells are traditionally topped up from time to time with suitably purified water to compensate for loss due to electrolysis and evaporation. This topping up is simple when the number of cells is small and the batteries are readily accessible, eg. car batteries etc.

With larger batteries, for example, batteries for producing tractive forces, standby power supplies, for computer and lighting duties, and so on the number of cells is often so large and the accessibility often so poor, that topping up can become particularly difficult and time consuming.

Maintenance free batteries have been developed but these are costly and not suitable for deep discharge cycling duties. Automatic topping up systems have been developed to alleviate topping up problems but they have proved insufficiently robust. Some systems have used a vacuum principle to draw water into the cells necessitating air tight cell constructions and the use of expensive pumping arrangements. Other systems have incorporated floats in direct contact with the electrolyte to detect and control the level of electrolyte. Such floats are exposed to mechanical wear and aggressive chemical attack and consequently have often proved unreliable.

SUMMARY OF THE INVENTION

The invention provides a filler unit for use in dispensing a liquid into a container to top up the container to a predetermined, desired level, the unit including a vessel for containing the liquid to be dispensed, means for establishing a predetermined, substantially constant head of liquid in the vessel, an orifice in the bottom of the vessel, and a downpipe communicating with the interior of the vessel through the orifice and extending from the bottom of the vessel, the unit being intended for location in use above the container with the pipe extending downwardly from the vessel into the container to a predetermined depth below the desired level, with the arrangement being such that liquid is able to flow from the vessel to the container under gravity along the flowpath defined by the orifice and the downpipe until such time as the liquid level in the container has risen to the desired level with the lower end of the downpipe immersed to the predetermined depth so that a condition of pressure equilibrium is attained in the flow path which causes the flow from the vessel to the container to cease automatically.

The unit may be provided with a liquid conveying conduit for continuously supplying liquid to the vessel and means for regulating the level in the vessel to establish the predetermined static head. In one form of the invention, the regulating means is an overflow at a predetermined height above the bottom of the vessel, while in another form, the regulating means comprises a valve arrangement which acts automatically to close off the supply conduit to cease the flow of liquid to the vessel when the pressure equilibrium condition is attained. A suitable valve arrangement is one in which a float positioned in the vessel carries a needle arranged to mate in a sealing manner with a valve seat in the conduit when the pressure equilibrium is attained and the liquid level in the vessel rises as a result of the cessation of flow to the container. In a further modification, the regulating means may comprise both a valve arrangement and an overflow.

There may be a baffle in the vessel spaced closely enough to the bottom of the vessel to allow liquid in the vessel to flow to the orifice by capillary action, and to provide a liquid seal between the downpipe and the vessel.

The unit may be adapted to be connected at an aperture formed in a roof of the container. The unit may then include a breather pipe to allow gases to escape from the container, a condensation chamber for condensing the gases and a passage for allowing the condensate to return to the vessel.

In one application of the invention, a filler unit of the type set forth above can be connected to the filling aperture of each one of a series of battery cells to top up the dilute acid within the cells to the desired level with purified water. In this application, each filler unit may be supplied from a single water conveying pipe communicating in series with the interiors of each of the filler units, and each unit may have an externally threaded or fastening portion adapted for connection into a corresponding threaded or fastening portion incorporated into the filling apertures of the cells. Preferably, the water conveying pipe is flexible with a degree of slack between each unit to allow the downpipes to be removed from the filling apertures independently of one another.

DESCRIPTION OF THE DRAWINGS

FIG. 1 shows a first simple embodiment of filler unit according to the invention FIG. 2 shows the unit of FIG. 1 when the equilibrium condition is attained;

FIG. 3 shows one way in which the invention can be applied to the topping up of a series of containers;

FIG. 4 shows an alternative orifice configuration;

FIG. 5 shows another alternative orifice configuration;

FIG. 6 shows one way of regulating the level of the liquid in the vessel;

FIG. 7 shows another way of regulating the level of the liquid in the vessel;

FIG. 8 shows how the feature of the embodiments of FIGS. 6 and 7 can be combined;

FIG. 9 shows the embodiment of FIG. 8 in the pressure equilibrium condition with liquid overflowing from the vessel;

FIG. 10 shows another embodiment of a unit according to this invention;

FIG. 11 shows yet another embodiment suited for use in topping up the cell of a battery;

FIG. 12 shows an elevational view of the unit of FIG. 11; and

FIG. 13 shows a sectional, perspective view of the unit of FIGS. 11 and 12

Each of the Figures is a sectional view, unless otherwise stated.

DESCRIPTION OF A PREFERRED EMBODIMENT

The principle of operation of a filler unit according to this invention will be described with reference to FIGS.

1 and 2 of the drawings, which show a simple embodiment of the invention.

The filler unit includes an open-topped vessel 10 which has an orifice 12 in its bottom. A downpipe 14 communicating with the interior of the vessel 10 extends downwardly through the orifice 12 from the bottom of the vessel. In use, the unit is positioned as shown over a container 16 which is to be topped up with liquid dispensed from the vessel to a predetermined, desired level 18. When the unit is correctly positioned, the lower end of the downpipe 14 is at a predetermined depth 22 below the level 18.

The vessel 10 is continuously filled with a liquid 20 which is to be dispensed to the container 16 to top up the liquid 19 accomodated within the container to the desired level 18. Means (not shown) are provided for maintaining a substantially constant depth 24 of liquid in the vessel i.e. for establishing a constant static head in the vessel.

When the liquid level in the container 16 is below the lower end of the downpipe 14 (as in FIG. 1), the liquid 20 in the vessel 10 is able to flow from the vessel, through the orifice and the downpipe, into the container. Eventually, the situation is reached when the lower end of the downpipe is blocked off by the rising liquid 19.

When the level of liquid 19 has risen to block off the down pipe 14, the air volume already within the downpipe will be trapped and will remain within the downpipe. The relatively small size of the orifice 12 will prevent the air from escaping upwards because the liquid at the orifice will be subject to surface tension. This surface tension remains unbroken whether the liquid is running or stationary within the orifice 12. The principle applies for liquids which wet and liquids which do not wet the surface of the material of which the vessel 10 and the orifice 12 are made. A small lip or ring extending from the orifice 12 into the downpipe 14 is beneficial when particularly strong wetting liquids are employed. It should be noted that with non-wetting liquid-surface combinations, the liquid can be allowed to run down the side of the downpipe but with wetting combinations this should be avoided.

The level of liquid 19 will continue to rise outside the downpipe 14 since the liquid 20 will continue to flow via the orifice 12. The rising liquid 19 will begin to exert a pressure against the air-liquid boundary at the bottom of the downpipe. The air pressure within the downpipe will consequently begin to rise. As the air pressure rises, the flow of liquid via the orifice is reduced progressively until the air pressure within the downpipe becomes equal to the pressure of the liquid at the orifice. The pressure of the liquid passing through the orifice is created by the head of liquid 20 above the orifice. When the upward pressure has risen to match the downward pressure, the flow of liquid via the orifice will cease automatically. The upward pressure acting against the liquid at the orifice is created by the liquid depth 22. Neglecting the effects of air compression, material distortion etc., and assuming a uniform liquid specific gravity, the liquid depth 22 will be equal to the liquid depth 24 at the point of pressure equilibrium. In practice, air compression plays a small but significant part and differences in the specific gravity of the liquids 19 and 20 could be substantial. Provided these are taken into account, a high degree of accuracy in the operation of the equipment described can be expected.

If the exact position of the lower end of the downpipe 14 relative to the container 16, the depth 24 of the liquid 20, the amount of air compression and the relative specific gravities of the liquids 19 and 20 are known, the operation of the apparatus described will always result in the vessel 16 being filled to a predictable level.

If the level of the liquid 19 in the container 16 should fall for any reason, the unit will operate automatically to restore the pressure equilibrium condition once more and to restore the liquid level in the container to the desired level 18.

In the remaining Figures of the drawings, parts corresponding to those described above are designated with the same reference numerals.

Instead of using a single downpipe 14 feeding into a single container 16 multiple downpipes 14A, 14B, 14C etc can be used to feed into multiple containers 16A, 16B, 16C, as shown in FIG. 3. A single vessel 10 can therefore be used to fill a number of containers, with attendant savings in cost and complexity. The length of the downpipes can be different to each other and still produce acceptable level control in each container, but the vessel 10 should not be operated other than level without special baffles, liquid retention sponges or the like for equalising or compensating the pressures at all the orifices.

The orifice 12 may have virtually any size or shape, provided that it is not too small to permit liquid to pass through it or not too large for surface tension effects to develop. FIG. 4 shows one alternative orifice configuration in which there are a series of spaced apart orifices 12A, 12B and so on. FIG. 5 shows another configuration in which multiple orifices are provided by a fibre packing 12C.

In the embodiment of FIG. 6, a pipe 26 is used to supply the vessel 10 continuously with liquid. The depth of liquid 20 in the vessel is regulated by means of an overflow 28 which is positioned to ensure that the depth of the liquid i.e. the static head is correct for achieving the pressure equilibrium condition when the level 18 is reached in the container 16. Excess liquid overflows to waste or for recycling. When flow through the orifice ceases, all inflowing liquid from the pipe 26 will overflow.

In the embodiment of FIG. 7, there is a float 30 within the vessel 10, with a needle 32 carried by the float. A pipe 34 which conveys liquid to the vessel 10 has a branchpipe 36 providing a valve seat 38 which is complementary in shape to the needle 32. The float 30 remains on the bottom of the vessel 10 when the inflow to the vessel from the branch pipe 36 is less than the outflow through the orifice 12. When the inflow exceeds the outflow, there will be an accumulation of liquid within the vessel 10, which results in the float rising. When the equilibrium condition is reached with zero flow through the orifice 12, the needle will seat tightly against the valve seat to prevent further inflow through the branch pipe 36.

Units according to the embodiment of FIG. 7 can be arranged in series, with each unit being supplied with liquid from the pipe 34. Each unit will operate independently to control the level of liquid within its container 16.

Since the upward force on the needle urging it to close off the branch pipe 36 is small, the needle and valve seat should be of a soft material which will allow for a liquid-tight seal between the parts. Also, the mating parts of the needle and valve seat should be matched to one another with accuracy to ensure a reliable seal. The pressure of the liquid in the pipe 28 and the branch pipe 36 should obviously not be sufficient to drive the needle away from its seat once the equilibrium condition is attained. Of course, the materials chosen for the float and valve components should be resistant to corrosive attack by the liquids used in the unit.

The further embodiment shown in FIG. 8 incorporates the regulating features of both the embodiments of FIGS. 6 and 7. Here, the vessel 10 is provided with an overflow 28 similar to that of FIG. 6, together with a valve arrangement similar to that of FIG. 7. The overflow 28 provides extra security in the regulation of the liquid level in the vessel, since the overflow is positioned very slightly above the required level of liquid in the vessel, so that if the valve fails to close properly, only a small inaccuracy in the depth of liquid will arise. FIG. 9 illustrates the situation when the liquid 20 is overflowing at the overflow 28.

While specific reference has been made to the use of a float valve arrangement, it is apparant that other valve arrangements could also be used to prevent liquid inflow to the vessel 10 when the equilibrium situation is attaned. Similarly, while the overflow has been described and illustrated as provided by the upper edges of the walls of the vessel, other types of overflow, such as an overflow pipe or weir, could also be used.

FIG. 10 shows a further, preferred modification. Here, there is a baffle plate 40 situated near to the bottom of the vessel 10 over the orifice 12. The space between the baffle plate and the bottom of the vessel is small enough to encourage capillary action of the liquid 20. This allows the liquid 20 to flow through to the orifice, but serves to retain a film of liquid even if the vessel 10 should be emptied. One effect of this feature is that an effective seal is created between the downpipe 14 and the vessel 10. In effect, the seal provides a cap for the downpipe 14 so that it will always contain the correct volume of air despite liquid level fluctuations in the container 16 or movement of the vessel 10 with consequent movement of the downpipe in a manner which covers and uncovers the open lower end of the downpipe.

The capillary action under the baffle plate 40 has the effect of raising the apparent position of the orifice 12 within vessel 10. The depth 24 of liquid within the vessel is now measured from the surface of the liquid to the edge of the baffle plate, which is the boundary of the capillary action. This effect is advantageous since it reduces the height restriction on the vessel 10, and permits a higher vessel construction to perform as if it were a lower vessel. The float 30 can be positioned higher up in the vessel and the overflow 28 can similarly be positioned higher up in the vessel. By constructing the vessel as low as possible and by arranging a float to control the inflow of liquid with the shortest possible travel, and by introducing the baffle 40, the depth 24 can be decreased. The depth 22 can also be decreased as a result. This leads to a greater degree of repeatibility and accuracy in controlling the total depth of liquid in the container 16.

The baffle plate 40 could alternatively be placed below the orifice to produce some of these advantages, for example, retention of liquid to provide a seal. Several baffle plates and orifices could be stacked to improve liquid retention and alter the relative position of the orifice.

Each of the embodiments described so far has application in the topping up of the secondary cells of a battery or a series of batteries. The embodiment of FIG. 11 is especially adapted for this purpose. The unit is fitted with a sleeve 41 provided with a thread 42 (see FIGS. 12 and 13) which allows the unit to be fitted to the top 44 of the battery housing at the conventional threaded apertures.

As in the embodiment of FIG. 10, the unit has a baffle plate 40 and a float valve arrangement and an overflow 28. The unit is modified by the provision of breather pipes 46 which allow evaporation from the interior of the container or cell 16 to escape into the vessel 10. At the upper ends of the breather pipes 46, there are condensation chambers 47 in which some of the evaporated gases are condensed. The condensate is able to return to the vessel 10 for re-use via escape holes 48. some of the returning condensate will serve to keep the float 30 wet, and hence improve its floating stability. Even if no additional liquid enters the vessel 10 through the branch pipe 36, then the returning condensate will also serve to provide the liquid seal in the capillary passage between the baffle 40 and the bottom of the vessel. The liquid 19 in the cell may be caused to form a spray or mist when in use, but most of the liquid lost in this way will be recovered in the vessel 10.

In this embodiment, the vessel 10 is fitted with a cap 50 which is of slightly larger diameter than the outside diameter than the walls of the vessel. Liquid which overflows the vessel at the overflow 28 is able to escape through the gap between the cap and the vessel walls.

When the filler unit described is fitted to a battery cell, electrical and chemical stimuli in the cell can produce an explosive mixture of gases in the cell. The gases will escape via breather pipes 46, the condensation chambers 47, the escape holes 48 and the overflow 28. The escaping gases could possibly be accidentally ignited outside the filler unit resulting in flame propagation taking place along the path of the escaping gases into the filler unit and the cell with the possibility of an explosion.

A method which has been in use for many years of cooling a propagated flame can easily be incorporated into the filler unit. a suitable medium is used to cool the flame sufficiently for it to be extinguished. The medium usually comprises a porous ceramic substance or a small gap between two spaced surfaces, which will allow gases to permeate or pass through but will, at the same time, cool the gases very rapidly of they are hotter than the cooling medium.

Suitable positions for such a flame cooling medium within the construction of the filler unit are the following: the overflow 28, which necessitates the use of a medium which does not restrict the passage of gas and liquid unduly; the escape holes 48 which would also enhance the process of condensation if a medium pervious to gas and impervious to liquid is employed; the breather pipes 46, which would necessitate the use of more permeable material than that used inside the escape holes; the space below the baffle plate 40 or within the orifice 12 or as substitute for the baffle plate or orifice or both, in which case only liquid and no gas should be able to pass though; or within the downpipe 14 or in the space between the downpipe 12 and the sleeve 14.

The filler unit of FIGS. 11 to 13 can be one of a series of such filler units each associated with a single one of the cells of a battery or batteries of cells. The pipe 34 can continue from one filler unit to the next in series. So that each independent filler unit can be removed from its cell when required, the pipe 34 may be flexible, and there should be a degree of slack in the pipe allowing the unit to be unscrewed. As depicted in the Figures the pipe 34 is only of short length, and could be of rigid construction, allowing flexible lengths of pipe to be connected between the ends of adjacent pipes 34 of adjacent units.

We claim:

1. A filler unit for use in dispensing a liquid into a container to top up the container to a predetermined, desired level, the unit including a vessel for containing the liquid to be dispensed, means for establishing a predetermined, substantially constant head of liquid in the vessel, at least one orifice in the bottom of the vessel, a baffle in the vessel spaced close to the bottom of the vessel to form a capillary passage to allow liquid to flow to at least one orifice by capillary action, and a downpipe extending downwards from the orifice below the vessel, the unit being intended for location in use above the container with the downpipe extending into the container such that in use the liquid is able to flow from the vessel to the container under gravity along the flowpath defined by the capillary passage, the orifice and the downpipe until such time as the liquid level in the container has risen to the desired level with the lower end of the downpipe below the level thereof to trap air in the downpipe and below the orifice and a condition of pressure equilibrium is attained in the flowpath which causes the flow from the vessel to the container to cease automatically.

2. A filler unit according to claim 1, including a liquid conveying conduit for supplying liquid to the vessel and means to establish the predetermined static head.

3. A filler unit according to claim 2, in which the regulating means is an overflow at a predetermined height above the bottom of the vessel.

4. A filler unit according to claim 3, in which the regulating means comprises a valve arrangement which acts automatically to close off the supply conduit to cease flow of liquid into the vessel when the pressure equilibrium condition is attained.

5. A filler unit according to claim 4, in which the valve arrangement includes a float positioned in the vessel and carries a needle arranged to mate with a valve seat in the conduit.

6. A filler unit according to claim 1, including a breather vent to allow gases to escape from the container, a condensation chamber for condensing the gases, and a passage for allowing the condensate to flow to the vessel.

7. A plurality of filler units according to claim 1, and a single conveying pipe communicating with each of the filler units.

8. A plurality of filler units according to claim 7, in which the single conveying pipe is a flexible pipe to permit the downpipe of selected filler units to be removed from the respective containers independently of one another.

9. A filler unit according to claim 1, in which the at least one orifice is formed by a pad of fibre packing material.

* * * * *